United States Patent

Shal et al.

[11] Patent Number: 6,097,999
[45] Date of Patent: Aug. 1, 2000

[54] VEHICLE SUSPENSION CONTROL SYSTEM AND METHOD

[75] Inventors: David Andrew Shal, Bellbrook; Albert Victor Fratini, Jr., Kettering, both of Ohio; Scott Wilson Badenoch, Bloomfield Hills, Mich.

[73] Assignee: General Motors Corporation, Detroit, Mich.

[21] Appl. No.: 09/097,057

[22] Filed: Jun. 12, 1998

[51] Int. Cl.⁷ .................................................. B60G 17/015
[52] U.S. Cl. ......................... 701/38; 280/5.506; 280/5.51
[58] Field of Search .................... 701/37, 38; 280/5.504, 280/5.506, 5.507, 5.508, 5.51

[56] References Cited

U.S. PATENT DOCUMENTS

| | | | |
|---|---|---|---|
| 4,621,832 | 11/1986 | Nakashima et al. | 280/5.515 |
| 4,803,630 | 2/1989 | Takizawa et al. | 701/39 |
| 4,852,905 | 8/1989 | Tanaka et al. | 280/707 |
| 4,921,272 | 5/1990 | Ivers | 280/707 |
| 5,013,062 | 5/1991 | Yonekawa et al. . | |
| 5,016,910 | 5/1991 | Nagai | 280/707 |
| 5,123,671 | 6/1992 | Driessen et al. | 280/5.519 |
| 5,144,559 | 9/1992 | Kamimura et al. | 364/424.05 |
| 5,219,181 | 6/1993 | Lund | 280/772 |
| 5,324,068 | 6/1994 | Kallenbach et al. | 280/707 |
| 5,444,621 | 8/1995 | Matsunaga et al. . | |
| 5,490,068 | 2/1996 | Shimizu et al. | 364/424.05 |
| 5,559,700 | 9/1996 | Majeed et al. . | |
| 5,559,701 | 9/1996 | Shimizu et al. | 364/424.05 |
| 5,570,288 | 10/1996 | Badenoch et al. . | |
| 5,570,289 | 10/1996 | Stacey et al. . | |
| 5,606,503 | 2/1997 | Shal et al. . | |

FOREIGN PATENT DOCUMENTS

| | | |
|---|---|---|
| 0243613 | 2/1987 | European Pat. Off. . |
| 0431646 | 6/1991 | European Pat. Off. . |
| 0706905 | 4/1996 | European Pat. Off. . |

OTHER PUBLICATIONS

Patent Abstracts of Japan; vol. 096, No. 008; Aug. 30, 1996; (JP 08–104121A).
Patent Abstracts of Japan; vol. 017, No. 397; Jul. 26, 1993; (JP 05–077624A).

(List continued on next page.)

*Primary Examiner*—Michael J. Zanelli
*Attorney, Agent, or Firm*—Robert M. Sigler

[57] ABSTRACT

In a vehicle with four corner suspensions, wherein during a transient turning maneuver, a body of the vehicle tends to compress two of the corner suspensions on a first side of the vehicle and expand two of the corner suspensions on a second side of the vehicle, wherein road inputs cause random compression and rebound of the four corner suspensions, a suspension control method comprising the steps of: sensing vehicle speed; monitoring steering wheel velocity; responsive to the vehicle speed and the steering wheel velocity, determining a signal indicative of a transient turning maneuver of the vehicle; responsive to the signal, determining compression damping commands for the two corner suspensions on the first side of the vehicle; responsive to the signal, determining rebound damping commands for the two corner suspensions on the second side of the vehicle; monitoring relative velocity of each corner suspension; applying the compression damping commands for the two corner suspensions on the first side of the vehicle when the relative velocities for those two corner suspensions indicate that they are in compression and terminating the compression damping commands for the two corner suspensions on the first side of the vehicle during the random rebounds of those two corner suspensions caused by the road inputs; and applying the rebound damping commands for the two corner suspensions on the second side of the vehicle when the relative velocities for those two corner suspensions indicate that they are in rebound and terminating the rebound damping commands for the two corner suspensions on the first side of the vehicle during the random compressions of those two corner suspensions caused by the road inputs.

10 Claims, 4 Drawing Sheets

OTHER PUBLICATIONS

Patent Abstracts of Japan; vol. 095, No. 010; Nov. 30, 1995; (JP 07–179113A).

Patent Abstracts of Japan; vol. 017, No. 555; Oct. 6, 1993; (JP 05–155223A).

Patent Abstracts of Japan; vol. 098, No. 001; Jan. 30, 1998; (JP 09–254622A).

Patent Abstracts of Japan; vol. 018, No. 589; Nov. 10, 1994; (JP 06–219130A).

FIG. 5 ically undergoes the effects. Thus this invention allows application of suspension control prior to the transient turning maneuver having substantial effect on the vehicle body.

VEHICLE SUSPENSION CONTROL SYSTEM AND METHOD

This invention relates to a vehicle suspension control system and method.

BACKGROUND OF THE INVENTION

Many automotive vehicles now have suspensions that vary damping force in response to control commands determined by a computer controller. The general desire is to improve overall vehicle ride comfort and handling.

SUMMARY OF THE INVENTION

It is an object of this invention to provide a vehicle suspension control system and method.

Advantageously this invention provides a vehicle suspension control system and method that responds to transient turning maneuvers of the vehicle. A transient turning maneuver is a maneuver in which the lateral acceleration of the vehicle changes due to a steering wheel input. For example, if the vehicle is driving straight ahead, or in a substantially constant radius turning maneuver, it is not in a transient turning maneuver. But when the vehicle enters or exits the turning maneuver or is in a turning maneuver in which the radius of the turn is not constant due to movement of the steering wheel, then the vehicle is in a transient turning maneuver.

Advantageously, this invention supplements the control in a vehicle that already has a suspension controller that detects body and wheel motion and generates commands in response thereto. This invention recognizes that certain vehicle states can indicate impending effects of a transient turning maneuver before the vehicle body actually undergoes the effects. Thus this invention allows application of suspension control prior to the transient turning maneuver having substantial effect on the vehicle body.

Advantageously, this invention anticipates when the vehicle is about to be effected by a transient turning maneuver and provides control commands to the suspensions to counter the effects of the transient turning maneuver on the vehicle body. Additionally, road inputs causing suspension movement during the transient turning maneuver are monitored and the suspension commands are selected based upon the effects of the road inputs on the suspension during the transient turning maneuver. The suspension commands are selected separately for each corner of the vehicle based upon whether the corner is expected to be in compression or rebound and based upon whether the corner is actually in compression or rebound.

According to a preferred example, a deadband function is implemented to prevent increase in damping force if only a very minor transient turning maneuver is detected.

Advantageously, then, according to a preferred example, this invention provides, in a vehicle with four corner suspensions, wherein during a transient turning maneuver, a body of the vehicle tends to compress two of the corner suspensions on a first side of the vehicle and expand two of the corner suspensions on a second side of the vehicle, wherein road inputs cause random compression and rebound of the four corner suspensions, a suspension control method comprising the steps of: sensing vehicle speed; monitoring steering wheel velocity; responsive to the vehicle speed and the steering wheel velocity, determining a signal indicative of a transient turning maneuver of the vehicle; responsive to the signal, determining compression damping commands for the two corner suspensions on the first side of the vehicle; responsive to the signal, determining rebound damping commands for the two corner suspensions on the second side of the vehicle; monitoring relative velocity of each corner suspension; applying the compression damping commands for the two corner suspensions on the first side of the vehicle when the relative velocities for those two corner suspensions indicate that they are in compression and terminating the compression damping commands for the two corner suspensions on the first side of the vehicle during the random rebounds of those two corner suspensions caused by the road inputs; and applying the rebound damping commands for the two corner suspensions on the second side of the vehicle when the relative velocities for those two corner suspensions indicate that they are in rebound and terminating the rebound damping commands for the two corner suspensions on the second side of the vehicle during the random compressions of those two corner suspensions caused by the road inputs.

Advantageously, then, according to another preferred example, this invention is implemented in a vehicle with four corner suspensions to provide a suspension control system comprising: a first sensor for monitoring vehicle speed; a second sensor for monitoring steering wheel angle; a third sensor at each corner suspension providing an output from which relative velocity of the corner suspension is determined; a computer controller comprising: (a) a lateral acceleration rate of change detector (172) responsive to the vehicle speed and the steering wheel velocity to determine a signal indicative of a transient turning maneuver of the vehicle; (b) a corner direction command generator (206) responsive to the signal, determining compression damping commands for two of the corner suspensions on a first side of the vehicle that tend to have suspension compression during the transient turning maneuver and determining rebound damping commands for two of the corner suspensions on a second side of the vehicle that tend to have suspension rebound during the transient turning maneuver; and (c) an apply command generator (210) responsive to the corner direction command generator and the corner relative velocities and applying the compression damping commands for the two corner suspensions on the first side of the vehicle when the relative velocities for those two corner suspensions indicate that they are in compression and terminating the compression damping commands for the two corner suspensions on the first side of the vehicle when the relative velocities for those two corner suspensions indicate that they are in rebound and applying the rebound damping commands for the two corner suspensions on the second side of the vehicle when the relative velocities for those two corner suspensions indicate that they are in rebound and terminating the rebound damping commands for the two corner suspensions on the second side of the vehicle when the relative velocities for those two corner suspensions indicate that they are in compression.

BRIEF DESCRIPTION OF THE DRAWINGS

The present invention will now be described by way of example with reference to the following figures, in which.

DETAILED DESCRIPTION OF THE INVENTION

Figure 1:
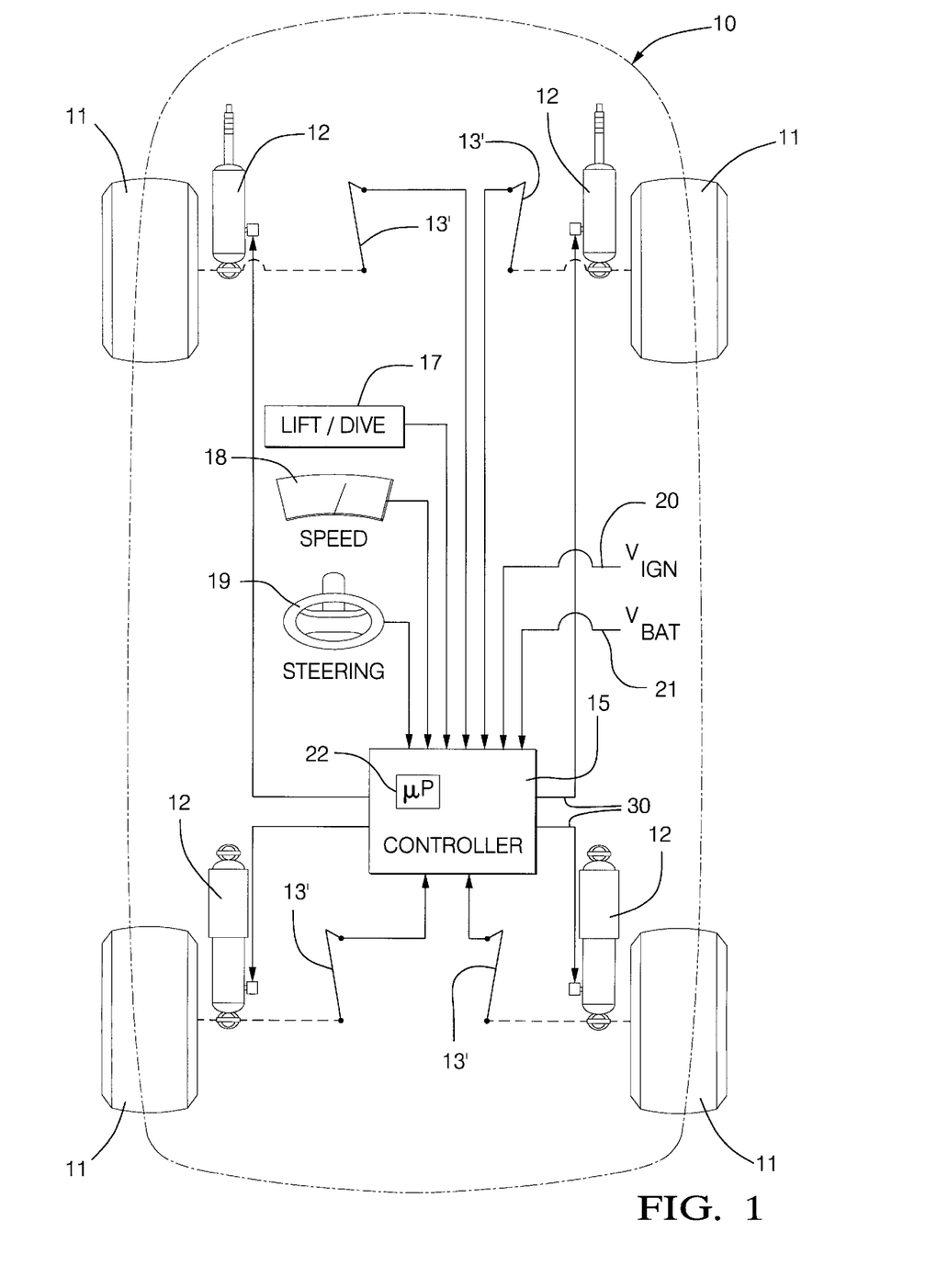
FIG. 1 illustrates an example apparatus according to this invention.

Referring to FIG. 1, an example apparatus for implementation of this invention is shown and, in general, comprises a vehicle body 10 supported by four wheels 11 and by four suspensions including springs of a known type (not shown). Each suspension includes a variable-force real time controllable damper 12 connected to exert a vertical force between wheel 11 and body 10 at that suspension point. Although many such suspension arrangements are known and appropriate to this invention, actuator 12 of the preferred embodiment comprises an electrically controllable, variable force damper in parallel with a weight bearing coil spring in a parallel spring/shock absorber or McPherson strut arrangement. A description of a variable force damper suitable for use as actuator 12 is the continuously variable damper described in U.S. Pat. No. 5,282,645, assigned to the assignee of this invention.

Each corner of the vehicle includes a linear position sensor 13 that provides an output signal indicative of the relative distance between the vehicle wheel and the suspended vehicle body at that corner of the vehicle. The outputs of the position sensors 13 may be differentiated to produce relative body-wheel vertical velocity signals for each corner of the vehicle and may be used, for example, as described in U.S. Pat. No. 5,606,503, to determine the body modal velocities of body heave velocity, body roll velocity and body pitch velocity. The relative body-wheel vertical velocity signal is an example of what is referred to herein as a set of parameters indicative of motion of a body of the vehicle and of motion of wheels of the vehicle.

An example position sensor 13 includes a rotary resistive device mounted to the vehicle body and a link pivotably coupled between both the vehicle wheel and a pivot arm on the rotary resistive device such that the rotary resistive device provides an impedance output that varies with the relative position between the wheel 11 and the corner of the body 10. Each position sensor 13 may further include an internal circuit board with a buffer circuit for buffering the output signal of the rotary resistive device and providing the buffered signal to the controller 15. Suitable position sensors 13 can be easily constructed by those skilled in the art. Any alternative type of position sensor, including transformer type sensors, may be used as position sensor 13.

The outputs of relative position sensors 13 are provided to a controller 15 which processes the signals, for example as described in U.S. Pat. No. 5,606,503, to determine the states of vehicle body 10 and wheels 11 and generates an output actuator control signal for each variable actuator 12. Controller 15 sends these signals through suitable output apparatus to control actuators 12 in real time. Other signals that the controller 15 may use include the lift/dive signal on line 17 used to anticipate vehicle pitch, the vehicle speed signal from sensor 18, and the steering wheel angular position from sensor 19. Obtaining such signals is easily achieved through the use of known types of sensors available to those skilled in the art.

Figure 2:
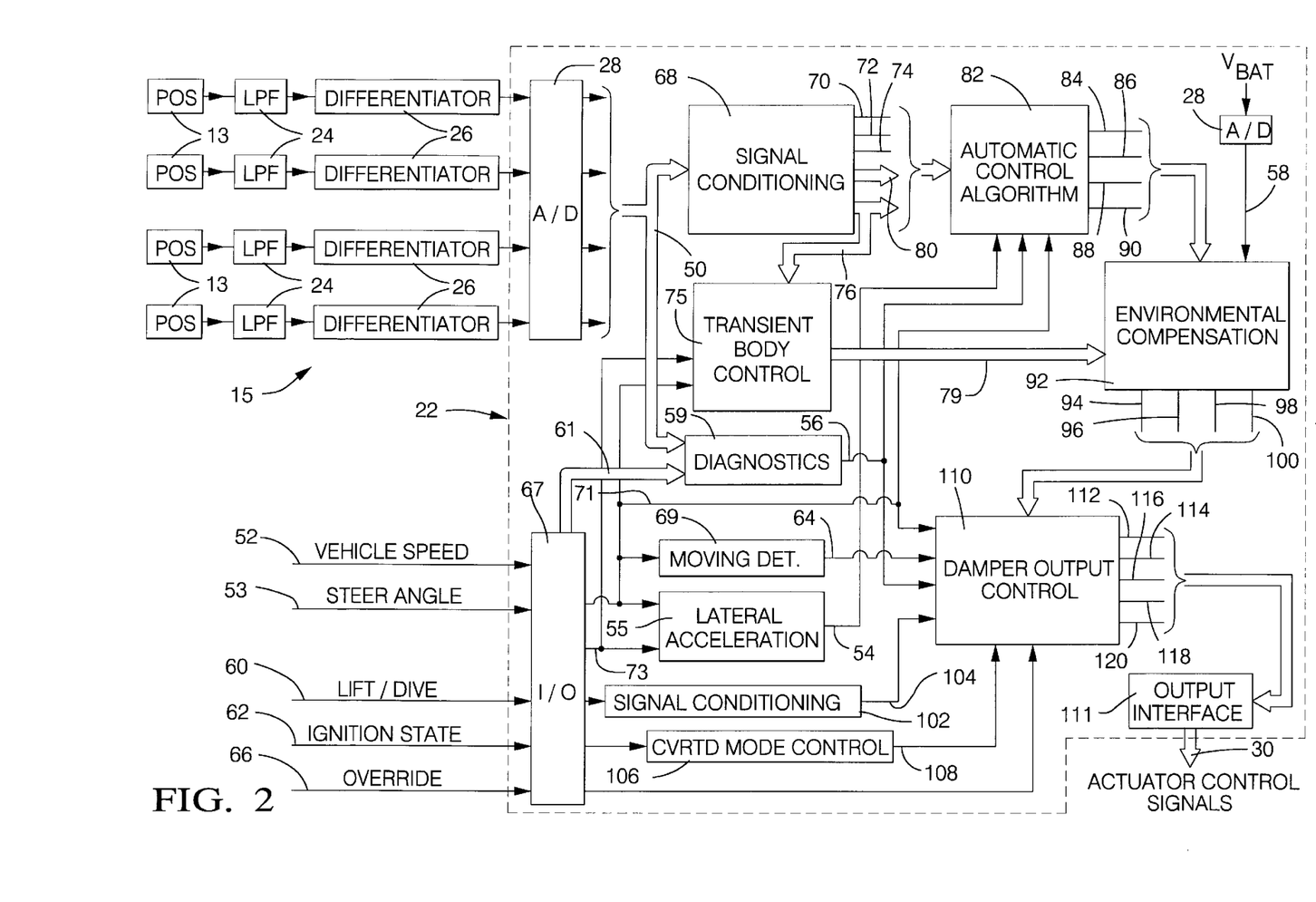
FIG. 2 illustrates an example control structure for a system implementing this invention.
Figure 3:
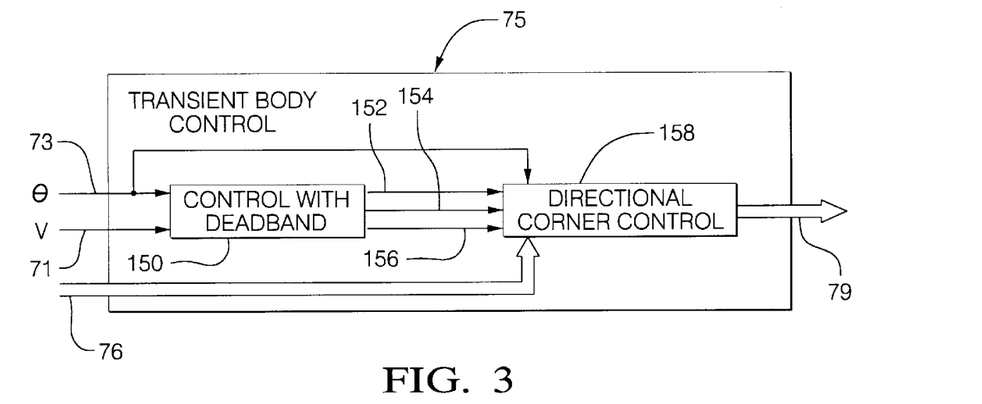
FIG. 3 illustrates an example high level control according to this invention.

Controller 15 is shown in more detail in FIG. 2. Signals from relative position sensors 13 are low-pass filtered through four analog low-pass filters 24 and differentiated through four analog differentiators 26 to provide four relative velocity signals. An exemplary combination of such a low pass filter and differentiator is shown in U.S. Pat. No. 5,255,191, issued Oct. 19, 1993. The resulting relative velocity signals represent the relative velocity between the front left wheel and the front left corner of the body, the rear left wheel and the rear left corner of the body, the front right wheel and the front right corner of the body, and the rear right wheel and the rear right corner of the body. Each of these relative velocity signals is input to a digital microcomputer 22, which includes an input A/D converter 28 with multiplexed inputs; and each is digitally high-pass filtered within microcomputer 22 to remove any DC offset introduced by the digitization of A/D converter 28. The relative velocity signals, processed as described below with reference to FIG. 3, are provided on buses 76 and 80, together with the body modal velocity signals on lines 70, 72 and 74 as a set of inputs to a control algorithm to help determine the output actuator control signals for the vehicle suspension system.

Referring to FIG. 2, a general block diagram of the control of this invention illustrates the processing of the input signals and the output of the control signal for control of the variable force actuators. It is assumed that the actuators are controlled by a PWM control. However, actuators of another type not based on PWM control can be substituted as an alternative and it will be recognized that variable force controls other than those with PWM control are equivalents to the PWM control example set forth herein.

The control is performed by a microprocessor suitable for providing PWM control output. Such microprocessors are known and readily available to those skilled in the art. The output of the control shown in FIG. 2, the PWM duty cycle commands on lines 112, 114, 116 and 118, may be in the form of signals representing duty cycles that standard microprocessors readily convert to the proper duty cycle PWM output, for example, vis-a-vis a standard PWM output interface 111.

Reference 50 represents the relative velocities of the four corner suspensions of the vehicle. The relative velocities are determined from the position sensors 13 by low pass filtering the outputs of sensors 13 through four analog low pass filters 24. The filtered outputs are then differentiated through four analog differentiators 26 to provide the four relative velocity signals. Each of these relative velocity signals is input into the microprocessor 22 through an A/D converter and results as one of the signals on lines 50 shown.

In an alternative example implementation, relative position sensors 13 are replaced with relative velocity sensors of a type known to those skilled in the art capable of outputting a signal indicative of the relative velocity between each wheel and corner of the vehicle body. In this alternative, there is no need for the differentiators described above used to convert the signals from sensors 13 to relative velocity signals.

Various discrete signals are provided to the microprocessor input/output port, illustrated schematically as reference 67. Line 52 carries a signal representing the vehicle speed and is preferably buffered in a known manner to remove unwanted noise and is represented by line 71 within the controller 22. Line 54 represents an input of computed lateral acceleration of the vehicle that is computed in a known manner (block 55) based on the steer angle of the front wheels (on lines 53 and 73), which may be determined from sensing the position of steering wheel 19 (FIG. 1), and based on vehicle speed. Line 56 represents an input from a standard diagnostic routine (block 59) that performs known diagnostic functions such as checking for open circuits and short circuits from the sensors 13 or actuators 12 or any of the other input lines (represented in general as bus 61). In response to a diagnostic failure command on line 56, control block 110 forces a default output on lines 112, 114, 116 and 118 to control the actuators in a default mode.

A/D converter 28 converts a signal representing the vehicle battery voltage to a digital signal on line 58. Block 92 uses the signal on line 58 to scale the duty cycle commands responsive to the battery voltage. The signal on line 60 is a signal that indicates the vehicle is in a dive (front end dip) or lift (front end rise) tendency situation such as occurs during hard braking or hard acceleration of the vehicle. This signal may be provided by a powertrain controller that determines a vehicle dive tending situation if a decrease in vehicle speed over a predetermined time period is greater than a predetermined limit and determines a lift tending situation if an increase in throttle angle over a predetermined time period is greater than a predetermined threshold. In general, the signal on line 60 is active when there is either a detected lift or dive, and is otherwise inactive.

The signal on line 62 is representative of the ignition voltage available when the vehicle is keyed on and is de-bounced in a known manner. The signal on line 64 indicates whether or not the vehicle is moving (block 69), for example, line 64 goes high when the vehicle speed is greater than 3 miles per hour. Line 66 is an override line that can be used for in-plant testing of the system. For example, a signal on line 66 can cause the dampers to cycle and the service operator can test the dampers to determine if they are cycling properly.

In general, the corner relative velocity signals on lines 50 are input to the signal conditioning block 68, which provides signals (a) of the vehicle body heave, roll and pitch velocities on lines 70, 72 and 74, (b) high pass filtered relative velocity signals for the four corners of the vehicle on bus 76 (four signals), and (c) the average vertical velocities of the four wheels of the vehicle on the bus 80 (four lines).

Block 102 receives the lift/dive discrete signal on line 60 and performs a de-bounce function of a known type, providing the de-bounced lift/dive signal on line 104 to block 110. Block 110 (1) further buffers the lift/dive signal, (2) determines whether or not a floor profile output override is active and, if so, responsive to the lift/dive signal, determines what PWM duty cycle to use as the floor (minimum duty cycle) and (3) applies the time-varying lift/dive PWM duty cycle floor as the minimum PWM duty cycle.

Block 106, the mode control, receives the ignition-on signal on line 62 (which is preferably de-bounced) and, if the ignition-on signal is active (indicating that the vehicle is on), outputs a signal on line 108 that enables the outputs of block 110. Without the enable signal on line 108, any commands determined will not be output on lines 112–120 and the controller is allowed to enter a standard "asleep" state of the type used in automotive controllers when the vehicle ignition is off. The signal on line 108 does not force any output command levels, but simply enables commands to be output from block 110.

Block 82 represents the control algorithm for implementing the variable force suspension control according to this invention and outputs on lines 84, 86, 88 and 90 filtered PWM duty cycle commands representing the force commands for each of the variable force actuators.

The filtered PWM duty cycle commands are provided to block 92 along with the signals on bus 79, described further below. Block 92 first selects the signal from the lines 84, 86, 88 and 90 that are greater than the signals for the corresponding corners of the vehicle on bus 79. Otherwise the signals on bus 79 are selected. Block 92 then scales the selected signals responsive to the battery voltage signal on line 58. The resultant scaled signals on lines 94, 96, 98 and 100 are provided to block 110, the optional override block. If a signal on line 66 indicates that the system is in override mode, a predetermined signal is output on each of lines 112–118 to control the actuators for testing. Also, if the diagnostics line 56 carries an error signal indicating that there is an error in the system, block 110 overrides the determined PWM commands on lines 94, 96, 98, 100 and provides a default PWM command that is scaled simply in response to vehicle speed, for example, as vehicle speed increases, the duty cycles of the PWM commands increase. This may be done in either a step-wise or a linear manner.

Block 75 responds to the filtered relative velocity signals on bus 76, the steering wheel angle signal on bus 73 and the buffered vehicle speed signal on line 71 to determine when the vehicle is in a transient turning maneuver. When the vehicle is in a transient turning maneuver, block 75 provides PWM commands on bus 79 for the four corners of the vehicle. The PWM commands on bus 79 determine a minimum duty cycle for the four actuators in certain conditions to enhance handling during the transient turning maneuvers. The control of block 75 has a deadband function to avoid premature switch to high force damping, has separate compression/rebound control based on whether each corner is in compression or rebound, and controls each corner independently based on the turning maneuver.

The commands on bus 79 are provided to block 92, described above. Block 75 is described in more detail below.

The resultant control outputs are provided on lines 112, 114, 116 and 118 and comprise the duty cycle commands for the four actuators in the suspension system. The damper low side control command is provided on line 120. The duty cycle commands on lines 112, 114, 116 and 118 are converted in a known manner to pulse width modulated signals having the duty cycles commanded by the signals on lines 112, 114, 116 and 118.

An example suitable microprocessor controller is a Motorola 68HC11 KA4, which is adapted for providing PWM output control commands. The interface between the microprocessor controller and the variable force dampers may be as follows.

Assume for purposes of example that each actuator 12 controls damping force responsive to a continuously variable electro-hydraulic pressure regulating valve assembly of the type shown in U.S. Pat. No. 5,282,645, issued Feb. 1, 1994, assigned to the assignee of this invention. (The disclosure of U.S. Pat. No. 5,282,645 is incorporated herein by reference.) The valve responds to a pulse width modulated signal and provides a continuously variable range of decrease in flow restriction of a bypass passage to the reservoir of the damper between maximum restricted flow when the valve is closed in response to a 0% duty cycle command and a minimum restricted flow when the valve is open and responsive to 100% duty cycle command, or vice versa. Each example valve includes a solenoid that, responsive to the PWM command for that damper, controls the flow restriction of that valve. A P-channel FET may be used as the switch for the high side of the valve solenoid and the low side of the valve solenoid is coupled via another FET controlled by output line 120. The high side P-channel FET may be driven by an N-channel FET that is directly driven by the output of the microprocessor. EMI filtering in a known manner may be implemented if desired. Similar circuit control may be implemented for the low side FET.

Those skilled in the art will understand that any suitable microprocessor-based controller capable of providing the appropriate actuator command and performing the required control routine can be used in place of the example set forth herein and are equivalents thereof. And those skilled in the art will also understand that a low side FET drive configuration of a known type can be substituted for the high-side drive described above.

U.S. Pat. No. 5,606,503 includes a more detailed description of the portions of the above-described FIG. 2 not central to this invention. The disclosure of U.S. Pat. No. 5,606,503 is incorporated herein by reference.

Referring now to FIG. 3, a general block diagram of the transient body control 75 is shown. The vehicle speed and steering wheel angle signals on lines 71 and 73 are provided to the control with deadband block 150. Block 150 determines the steering wheel velocity and provides a signal thereof on line 152 and determines front and rear transient control PWM commands and provides signals thereof on lines 154 and 156. The function of block 150 will be described in more detail below with reference to FIG. 4.

The steering wheel angle signal on line 73 and the high pass filtered relative velocity signals on bus 76 are provided to the directional corner control block 158 along with the signals on lines 152, 154 and 156. The directional corner control block 158 determines which corners (e.g., front left, front right, rear left and rear right) to provide the front and rear transient control PWM commands based on steering wheel angle, steering wheel velocity, and whether each corner is in compression or rebound. Block 158 provides the resultant directional transient control PWM commands on bus 79. The detailed operation of block 158 is described in more detail below with reference to FIG. 5.

Figure 4:
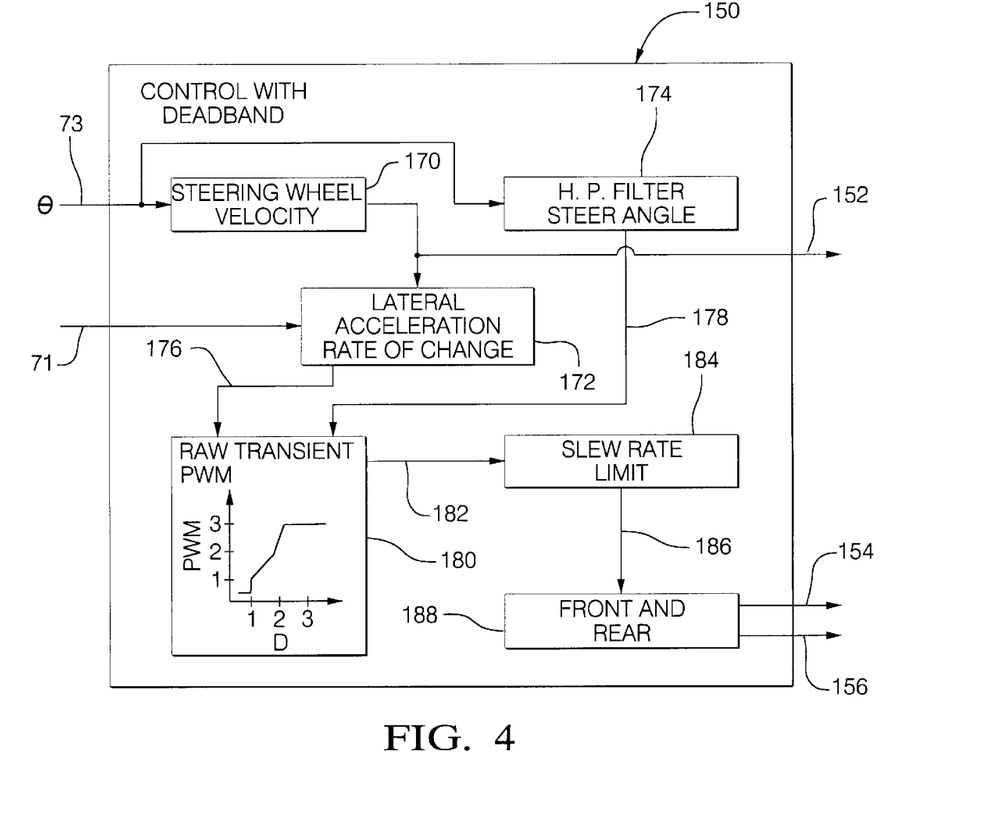
FIG. 4 illustrates an example detail control according to this invention.

Referring now to FIG. 4, the control with deadband block 150 determines the steering wheel velocity at block 170 by differentiating the steering wheel angle signal on line 73. For example, a second order digital differentiating filter may be implemented according to the following function:

$$H(z) = \frac{g_1 * (1 - z^{-1})}{(1 - c_1 * z^{-1} + c_2 * z^{-2})},$$

where $g_1$ is the filter gain and $c_1$ and $c_2$ are the filter coefficients selected to provide the desired differentiator operation at the applicable frequency and loop time. For example, at a one millisecond sampling interval (1 kHz sampling frequency) and loop time, the following coefficients may provide the desired response: $g_1=11.1$, $c_1=1.8705$ and $c_2=0.8816$. The system designer can adjust these factors to tune the phase and frequency response of the filter as desired. The steering wheel velocity signal determined by block 170 is provided on line 152.

Block 174 high pass filters the steering wheel angle signal and provides the high pass filtered signal, $\theta_f$, on line 178. The high pass filter implemented at block 174 may, for example, be a digital filter implementing the following function:

$$H(z) = \frac{1 - z^{-1}}{1 - c_3 * z^{-1}},$$

where $c_3$ is a coefficient selected to remove dc bias on the steering wheel angle such as may be introduced when the road surface is not exactly horizontal. For example, at a one millisecond sampling frequency and loop time, the following coefficient may provide the desired response: c3 is 0.997. The system designer can adjust this factor to tune the filter as desired.

The steering wheel velocity signal on line 152 along with the vehicle speed signal on line 71 are provided to block 172, which determines the signal on line 176. The signal on line 176 is referred to as the delta lateral acceleration and represents the change in lateral acceleration due to change in steering angle. Block 172 first determines the delta lateral acceleration signal by determining the vehicle speed-dependent portion of the signal, $l_v$, according to:

$$l_v = \frac{v_v^2}{(g_{us} * v_v^2 + g_{wb})},$$

where $v_v$ is the vehicle speed, $g_{us}$ is the steering gear ratio times an understeer coefficient of the vehicle and $g_{wb}$ is the steering gear ratio times the vehicle wheel base. Block 172 then determines the delta lateral acceleration signal, $d_{la}$, according to:

$$d_{la}=|l_v * v_\theta|,$$

where $v_\theta$ is the steering wheel velocity signal on line 152. According to the above equation, $d_{la}$ is directly proportional to steering wheel velocity and, if the steering wheel is not moving, i.e., $v_\theta=0$, then $d_{la}$ equals zero.

The signal $d_{la}$ on line 176 and the signal $\theta_f$ on line 178 are provided to block 180, which determines the raw transient PWM command (i.e., specifying the duty cycle) on line 182. Block 180 determines the raw transient PWM command by first comparing the signal $\theta_f$ to a threshold. If $\theta_f$ is greater than the threshold, then the raw transient PWM command is determined by the function shown in block 180, increasing non-linearly as $d_{la}$ increases until a maximum command is reached. If $\theta_f$ is not greater than the threshold, then the transient body control is in the deadband region where it does not generate suspension commands and the raw transient PWM command is set to zero, or its minimum value.

The raw transient PWM command on line 182 is provided to block 184 which implements a slew rate limit filter function on the raw transient PWM command signal and provides the result, the filtered transient PWM command, on line 186. More particularly, if the raw transient PWM command is greater than the filtered transient PWM command, then the filtered transient PWM command is set equal to the raw transient PWM command. If the filtered transient PWM command minus the raw transient PWM command is less than delta, a predetermined constant, then the filtered transient PWM command is set equal to the raw transient PWM command. Otherwise the filtered transient PWM command is set equal to the filtered transient PWM command minus delta. This filter allows immediate increase in the filtered transient PWM command but controls the rate of decrease of that command.

Block 188 multiplies the filtered transient PWM command on line 186 by front and rear scale factors to determine the front and rear transient control PWM commands on lines 154 and 156, respectively. The scale factors used to determine the signals on lines 154 and 156 are selected by the system designer to apportion as desired the relative control between the front and rear suspensions as the designer sees fit to achieve the desired performance of a given vehicle.

Figure 5:
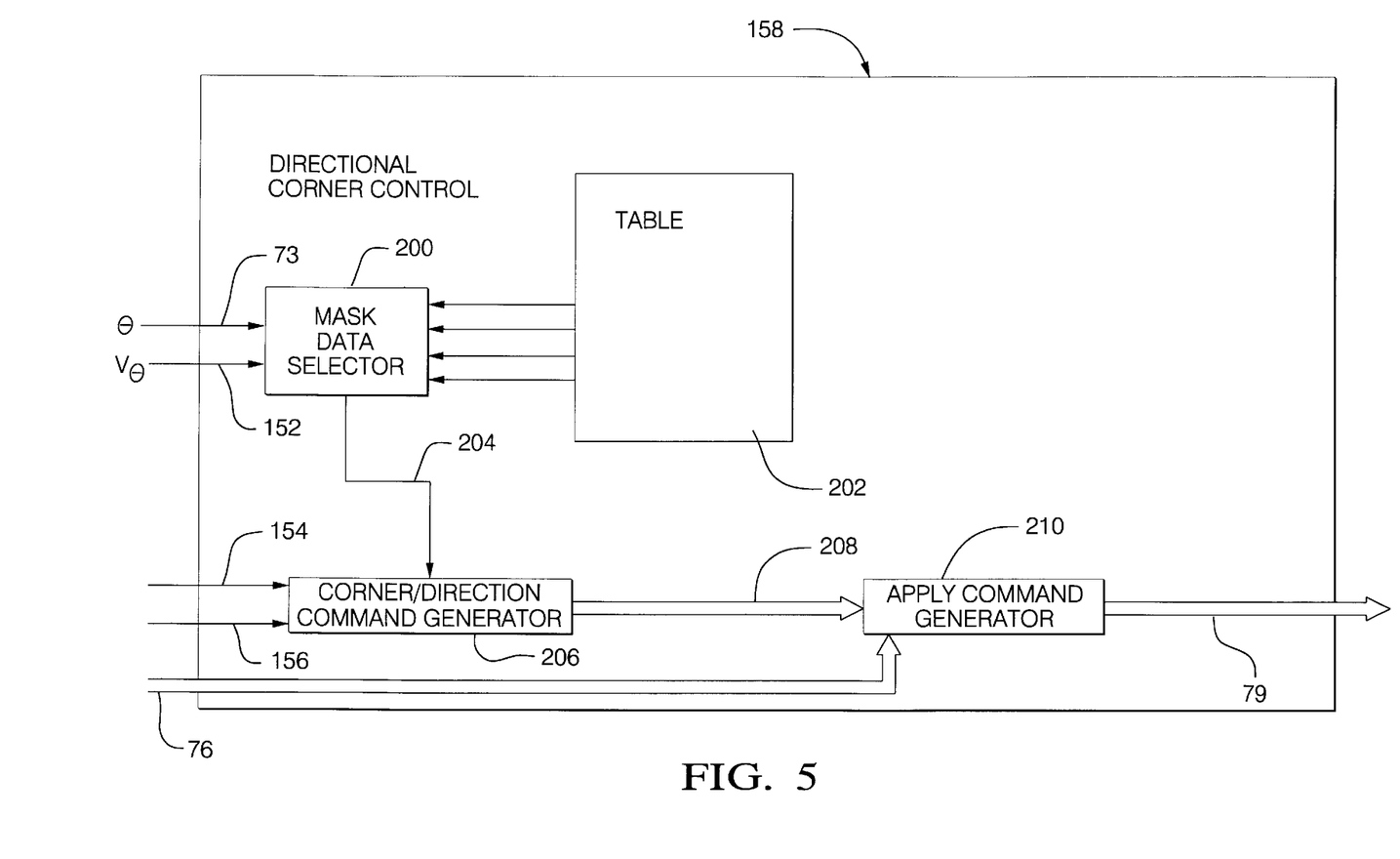
FIG. 5 illustrates another example detail control according to this invention.

Referring now to FIG. 5, the directional corner control block 158 includes a mask data selector block 200. Block 200 receives the steering angle and velocity signals on lines 73 and 152 and uses those signals to select which of the three data elements or bytes stored in the table 202 are used as the selected mask data element as described below with reference to block 206. Each mask data element is coded to define a unique relationship to the four corner suspensions for both compression and rebound modes. An example table stored in block 202 is as follows:

|  | COMPRESSION | | | | REBOUND | | | |
| --- | --- | --- | --- | --- | --- | --- | --- | --- |
|  | LF (bit 7) | RF (bit 6) | LR (bit 5) | RR (bit 4) | LF (bit 3) | RF (bit 2) | LR (bit 1) | RR (bit 0) |
| Left in byte | 0 | 1 | 0 | 1 | 1 | 0 | 1 | 0 |
| Right in byte | 1 | 0 | 1 | 0 | 0 | 1 | 0 | 1 |
| Left out byte | 1 | 1 | 1 | 1 | 1 | 1 | 1 | 1 |
| Right out byte | 1 | 1 | 1 | 1 | 1 | 1 | 1 | 1 |

If $\theta$ is less than zero and if $v_\theta$ is less than zero, then the MASK byte (i.e., the selected mask data element) is set equal to the left in byte. If both $\theta$ and $v_\theta$ are greater than zero, then the MASK byte is set to the right in byte. If $\theta$ is less than zero and if $v_\theta$ is not less than zero, then the MASK byte is set equal to the left out byte. Otherwise, the MASK byte is set equal to the right out byte.

The MASK byte is provided on line 204 along with the signals on lines 154 and 156 to corner direction command generator block 206, which determines the eight corner/direction PWM commands on bus 208. More particularly, block 206 first determines four front PWM commands, which are the left front compression command, the left front rebound command, the right front compression command and the right front rebound commands. The left front compression command is set equal to the front transient control PWM command if bit 7 of the MASK byte is set equal to 1. The left front rebound command is set equal to the front transient control PWM command if bit 3 of the MASK byte is set equal to 1. The right front compression command is set equal to the front transient control PWM command if bit 6 of the MASK byte is set equal to 1 and the right front rebound command is set equal to the front transient control PWM command if bit 2 of the MASK byte is set equal to 1. If for any of the four front compression or rebound commands the corresponding bit of the MASK byte is 0, then those commands for which the corresponding bits are 0 are set to zero.

In the table above, the bit settings can be calibrated based upon the specific performance of the vehicle into and out of transient turning maneuvers. The allocation of the bits to the corners and directions above is arbitrary and can be set with any correspondence desired by the system designer.

Block 206 next determines four rear PWM commands, which are the left rear compression command, the left rear rebound command, the right rear compression command and the right rear rebound commands. The left rear compression command is set equal to the rear transient control PWM command if bit 5 of the MASK byte is set equal to 1. The left rear rebound command is set equal to the rear transient control PWM command if bit 1 of the MASK byte is set equal to 1. The right rear compression command is set equal to the rear transient control PWM command if bit 4 of the MASK byte is set equal to 1 and the right rear rebound command is set equal to the rear transient control PWM command if bit 0 of the MASK byte is set equal to 1. If for any of the four rear compression or rebound commands the corresponding bit of the MASK byte is 0, then those commands for which the corresponding bits are 0 are set to zero. The four compression commands and four rebound commands are referred to collectively as the corner/direction PWM signals provided on bus 208.

The signals on bus 208 are provided to apply command generator block 210, which uses the high pass filtered relative velocity signals on bus 76 to determine which duty cycle signal to provide to each corner as the directional transient control PWM command on bus 79. For each corner, if the corresponding high pass filtered relative velocity signal is greater than or equal to zero, indicating that the corner is in rebound, then the rebound command for that corner is selected as the directional transient control PWM command on bus 79. Otherwise the compression command for that corner is selected as the directional transient control PWM command on bus 79. Taking the right front corner for example, if the high pass filtered relative velocity signal for that corner is greater than or equal to zero, then the right front directional transient control PWM command is set equal to the right front rebound command. Otherwise the right front directional transient control PWM command is set equal to the right front compression command. The directional transient control PWM commands for the left front, left rear and right rear corners are determined in a similar manner.

Through the use of the mask data elements the controller controls the left and right suspensions during transient turning maneuvers, that is, maneuvers that occur when the driver puts the vehicle steering wheel in motion. In general, if the transient turning maneuver would tend to cause a body roll velocity to the left, then the application of the selected mask data element increases the damping on the left side of the vehicle during suspension compression (the wheel moves closer to the body corner) and on the right side of the vehicle during suspension rebound (the wheel moves away from the body corner). The use of the high pass filtered relative velocity signals confirms whether a damper is in compression or rebound. For example, the vehicle may be maneuvering in a situation that tends to cause body roll velocity to the left and therefore compression of the left corner suspensions. In this situation, it is generally desired to increase damping preventing compression of the left corner suspensions. But road inputs such as bumps in the road may cause temporary movement of the left front or rear suspensions imposing accelerated compression followed by a rebound. Maintaining the accelerated compressed state is not desirable because it may contribute to undesirable body movement. It is desired that the suspension be allowed to travel in rebound with minimum restriction from the damper to avoid this effect. Thus the compression command for that corner is not desired and is not applied to that corner while the corner remains in rebound. Once the rebound event ends, the compression command is once again applied.

Similar treatment is given to the rebound commands on the other side of the vehicle. In the example where the maneuver tends to cause roll velocity to the left, it is generally desired to increase damping to prevent rebound of the right corner suspensions. If a road input such as a bump in the road causes temporary compression of a right corner suspensions, then it is desired that the compression event not transfer unnecessary harshness to the body. Thus the rebound command for that corner is not desired and is not applied to that corner while the corner remains in compression. Once the compression event ends, the rebound command is once again applied.

When the vehicle exits a transient turning maneuver, body motion may occur in the direction opposite that imposed during the transient turning maneuver. Thus the left out and right out bytes specify application of damping to all corners in compression and rebound to achieve maximum body control. This need not be the case though.

While movement of the steering wheel generally triggers the above control, block 150 (FIG. 4) implements the steering angle deadband function, which prevents the control from triggering if steering angle determined from block 174 is not greater than the deadband threshold utilized at block 180 (also FIG. 4). This deadband function filters out incidental steering movements due to the vehicle wheels hitting bumps on the road.

What is claimed is:

1. In a vehicle with four corner suspensions, a suspension control method according to the steps of:

sensing vehicle speed;

monitoring steering wheel angle;

monitoring steering wheel velocity;

responsive to the vehicle speed and the steering wheel velocity, determining a signal indicative of a transient turning maneuver of the vehicle;

responsive to the signal and the steering wheel angle, determining compression damping commands for two of the corner suspensions on a first side of the vehicle that tends to have suspension compression during the transient turning maneuver and determining rebound damping commands for two of the corner suspensions on a second side of the vehicle that tends to have suspension rebound during the transient turning maneuver;

monitoring relative velocity of each corner suspension;

applying the compression damping commands for the two corner suspensions on the first side of the vehicle when the relative velocities for those two corner suspensions indicate that they are in compression and terminating the compression damping commands for the two corner suspensions on the first side of the vehicle when the relative velocities for those two corner suspensions indicate that they are in rebound; and applying the rebound damping commands for the two corner suspensions on the second side of the vehicle when the relative velocities for those two corner suspensions indicate that they are in rebound and terminating the rebound damping commands for the two corner suspensions on the second side of the vehicle when the relative velocities for those two corner suspensions indicate that they are in compression.

2. A suspension system control method according to claim 1, wherein the compression and rebound damping commands are set to zero if the steering wheel angle is less than a predetermined threshold value.

3. A suspension system control method according to claim 1, also comprising the steps of:

storing a table of mask data elements into a controller memory;

wherein the compression and rebound damping commands are determined responsive to the sub-steps of:

determining front and rear transient control commands responsive to the signal;

selecting one of the mask data elements responsive to the steering wheel angle and the steering wheel velocity;

applying the selected mask data element to the front and rear transient control commands to determine the compression and rebound damping commands based upon settings of individual bits of the selected mask data element.

4. In a vehicle with four corner suspensions, wherein during a transient turning maneuver, a body of the vehicle tends to compress two of the corner suspensions on a first side of the vehicle and expand two of the corner suspensions on a second side of the vehicle, wherein road inputs cause random compressions and rebounds of the four corner suspensions, a suspension control method comprising the steps of:

sensing vehicle speed;

monitoring steering wheel velocity;

responsive to the vehicle speed and the steering wheel velocity, determining a signal indicative of the transient turning maneuver of the vehicle;

responsive to the signal, determining compression damping commands for the two corner suspensions on the first side of the vehicle;

responsive to the signal, determining rebound damping commands for the two corner suspensions on the second side of the vehicle;

monitoring relative velocity of each corner suspension;

applying the compression damping commands for the two corner suspensions on the first side of the vehicle when the relative velocities for those two corner suspensions indicate that they are in compression and terminating the compression damping commands for the two corner suspensions on the first side of the vehicle during the random rebounds of those two corner suspensions caused by the road inputs; and applying the rebound damping commands for the two corner suspensions on the second side of the vehicle when the relative velocities for those two corner suspensions indicate that they are in rebound and terminating the rebound damping commands for the two corner suspensions on the first side of the vehicle during the random compressions of those two corner suspensions caused by the road inputs.

5. A suspension control method according to claim 4, wherein the signal indicative of the transient turning maneuver is indicative of the lateral acceleration rate of change due only to vehicle speed and steering wheel velocity.

6. A suspension control method according to claim 4, wherein the signal indicative of the transient turning maneuver is directly proportional to steering wheel velocity.

7. In a vehicle with four corner suspensions, a suspension control system comprising:

a first sensor for monitoring vehicle speed;

a second sensor for monitoring vehicle steering wheel angle;

means for deriving a vehicle steering wheel velocity from the vehicle steering wheel angle;

a third sensor at each corner suspension providing an output from which relative velocity of the corner suspension is determined, and a computer controller comprising:
   (a) a lateral acceleration rate of change detector (172) responsive to the vehicle speed and the steering wheel velocity to determine a signal indicative of a transient turning maneuver of the vehicle;
   (b) a corner direction command generator (206), responsive to the signal and the steering wheel angle, for determining compression damping commands for two of the corner suspensions on a first side of the vehicle that tends to have suspension compression during the transient turning maneuver and determining rebound damping commands for two of the corner suspensions on a second side of the vehicle that tends to have suspension rebound during the transient turning maneuver; and
   (c) an apply command generator (210), responsive to the corner direction command generator and the corner relative velocities for applying the compression damping commands for the two corner suspensions on the first side of the vehicle when the relative velocities for those two corner suspensions indicate that they are in compression and terminating the compression damping commands for the two corner suspensions on the first side of the vehicle when the relative velocities for those two corner suspensions indicate that they are in rebound and applying the rebound damping commands for the two corner suspensions on the second side of the vehicle when the relative velocities for those two corner suspensions indicate that they are in rebound and terminating the rebound damping commands for the two corner suspensions on the second side of the vehicle when the relative velocities for those two corner suspensions indicate that they are in compression.

8. A suspension control system according to claim 7, wherein the signal indicative of the transient turning maneuver of the vehicle is directly proportional to the steering wheel velocity.

9. A suspension control system according to claim 7, also comprising:
   a table (202) of mask data elements stored in computer controller memory, wherein each mask data element provides a unique relation to the four corner suspensions;
   a mask data selector (200) responsive to the steering wheel velocity to select one of the mask data elements stored in the table, wherein the corner direction command generator determines the compression and rebound damping commands responsive to the unique relation to the four corner suspensions defined by the selected mask data element.

10. In a vehicle with four corner suspensions, a suspension control system comprising:
   a first sensor for monitoring vehicle speed;
   a second sensor for monitoring vehicle steering wheel angle;
   means for deriving a vehicle steering wheel velocity from the vehicle steering wheel angle;
   a third sensor at each corner suspension providing an output from which relative velocity of the corner suspension is determined, and
   a computer controller comprising:
      (a) a lateral acceleration rate of change detector (172) responsive to the vehicle speed and the steering wheel velocity to determine a signal indicative of a transient turning maneuver of the vehicle;
      (b) a configurable mask data table, having data stored in units of multiple bits with each bit corresponding to a direction of movement of one of the corner suspensions;
      (c) a mask data selector responsive to steering wheel angle and steering wheel velocity to select a unit from the mask data table;
      (d) a corner direction command generator (206), responsive to the signal and the steering wheel angle, for determining compression damping commands and rebound damping commands for the four corner suspensions responsive to individual bits of the selected unit; and
      (e) an apply command generator responsive to the corner direction command generator and the corner relative velocities to apply the compression and rebound damping commands to the four corner suspensions.

* * * * *